United States Patent
Koste

(10) Patent No.: US 11,368,225 B2
(45) Date of Patent: Jun. 21, 2022

(54) SATELLITE RELAY COMMUNICATION SYSTEMS

(71) Applicant: General Electric Company, Schenectady, NY (US)

(72) Inventor: Glen Peter Koste, Schenectady, NY (US)

(73) Assignee: GENERAL ELECTRIC COMPANY, Niskayuna, NY (US)

(*) Notice: Subject to any disclaimer, the term of this patent is extended or adjusted under 35 U.S.C. 154(b) by 23 days.

(21) Appl. No.: 16/821,546

(22) Filed: Mar. 17, 2020

(65) Prior Publication Data

US 2021/0152248 A1    May 20, 2021

Related U.S. Application Data

(60) Provisional application No. 62/936,978, filed on Nov. 18, 2019.

(51) Int. Cl.
| | |
|---|---|
| *H04B 10/29* | (2013.01) |
| *H04J 14/02* | (2006.01) |
| *H04B 10/40* | (2013.01) |
| *H04B 10/11* | (2013.01) |
| *H04J 14/08* | (2006.01) |

(52) U.S. Cl.
CPC ........... *H04B 10/29* (2013.01); *H04B 10/11* (2013.01); *H04B 10/40* (2013.01); *H04J 14/02* (2013.01); *H04J 14/08* (2013.01)

(58) Field of Classification Search
CPC ........ H04B 10/29; H04B 10/11; H04B 10/40; H04J 14/02; H04J 14/08

USPC .......................................................... 398/79
See application file for complete search history.

(56) References Cited

U.S. PATENT DOCUMENTS

| | | | |
|---|---|---|---|
| 6,262,997 B1 | 7/2001 | Quayle | |
| 6,912,075 B1 | 6/2005 | Ionov et al. | |
| 7,103,280 B1 | 9/2006 | Ionov et al. | |
| 7,509,049 B2 | 3/2009 | Lou et al. | |
| 7,593,641 B2 * | 9/2009 | Tegge, Jr. ............. | H04B 10/118 398/118 |
| 9,077,449 B2 | 7/2015 | Coleman et al. | |
| 10,312,999 B2 * | 6/2019 | Neuman ............... | H04B 10/118 |

OTHER PUBLICATIONS

Moeyaert, Veronique, et al.; "Network Technologies for Broadband Access", 2011 13th International Conference on Transparent Optical Networks, Stockholm, pp. 01-05, Jun. 26-30, 2011.

(Continued)

*Primary Examiner* — Mohammad R Sedighian
*Assistant Examiner* — M R Sedighian
(74) *Attorney, Agent, or Firm* — Fletcher Yoder, P.C.

(57) ABSTRACT

A satellite relay communication system includes a central terminal. The central terminal includes a passive optical router and a multiplexer. The satellite relay communication system also includes remote terminals, each remote terminal including an optical transceiver configured to send optical signals to the passive optical router, configured to receive optical signals from the passive optical router, and configured to multiplex optical signals received from the passive optical router.

10 Claims, 12 Drawing Sheets

(56) References Cited

OTHER PUBLICATIONS

Fuchs, Christian, et al.; "Ground Station Network Optimization for Space-To-Ground Optical Communication Links", IEEE/OSA Journal of Optical Communications and Networking, vol. 07, Issue: 12, pp. 1148-1159, Dec. 2015.

Liao, Sheng-Kai, et al.; "Satellite-Relayed Intercontinental Quantum Network", Physical Review Letters, vol. 120, Issue: 03, Jan. 19, 2018.

* cited by examiner

SATELLITE RELAY COMMUNICATION SYSTEMS

CROSS-REFERENCE TO RELATED APPLICATION

This application claims priority to and the benefit of provisional U.S. Application No. 62/936,978, entitled "SATELLITE RELAY COMMUNICATION SYSTEMS", filed Nov. 18, 2019, which is herein incorporated by reference in its entirety.

STATEMENT REGARDING FEDERALLY SPONSORED RESEARCH & DEVELOPMENT

This invention was made with Government support under contract number FA9453-14D-0312/TO0002 awarded by the Department of Defense. The Government has certain rights in the invention.

BACKGROUND

The subject matter disclosed herein relates to satellite relay communication systems.

Satellite relay communication systems may be used for a variety of communication purposes. Traditional satellite relay communication systems may include high bandwidth or other opto-electronics installed in a central terminal included as a payload on a satellite. It is now recognized that the electronics arrangements of traditional satellite relay communication systems contribute to increased maintenance costs and burdens, increased launch time and costs, and decreased network reliability.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A satellite relay communication system includes a central terminal for a satellite. The central terminal includes a passive optical router and a multiplexer. The satellite relay communication system also includes remote terminals, each remote terminal having an optical transceiver configured to send optical signals to the passive optical router, receive optical signals from the passive optical router, and demultiplex optical signals received from the passive optical router.

A satellite relay communication system includes a central terminal having a passive optical router and a multiplexer. The central terminal is configured to receive optical signals from a first remote terminal and a second remote terminal of the satellite relay communication system, duplicate and multiplex the optical signals to form a number of duplicate composite optical signals, and send the duplicate composite optical signals toward remote terminals of the satellite relay communication system. The satellite relay communication system also includes the remote terminals, which include demultiplexers configured to demultiplex the number of duplicate composite optical signals received from the central terminal at the remote terminals.

A method of communicating with a satellite relay communication system includes transmitting a first optical signal from a first remote terminal of the satellite relay communication system to a central terminal of the satellite relay communication system. The method also includes transmitting a second optical signal from a second remote terminal of the satellite relay communication system to the central terminal of the satellite relay communication system. The method also includes receiving the first optical signal and the second optical signal at the central terminal. The method also includes multiplexing and duplicating the first optical signal and the second optical signal, via a passive optical router and/or multiplexer of the central terminal, into a number of duplicate composite optical signals. The method also includes transmitting the number of duplicate composite optical signals toward corresponding remote terminals. The method also includes demultiplexing the number of duplicate composite optical signals via the corresponding remote terminals.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
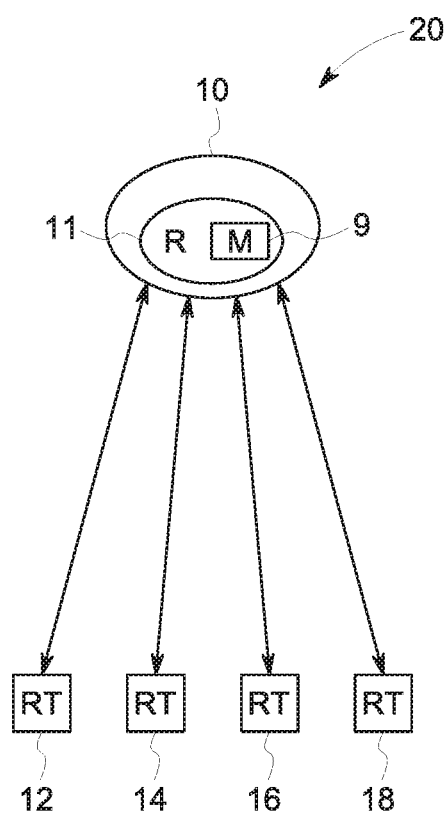
FIG. 1 is a schematic view of an embodiment of a satellite relay communication system having a central terminal with a passive optical network.

The subject matter disclosed herein relates to satellite relay communication systems and, more particularly, to passive optical networks for satellite relay communication systems.

As briefly discussed above, traditional satellite relay communication systems may include high bandwidth electronics, electrical switches, optical switches, optical filters, optical demultiplexers, or other opto-electronics installed in a central terminal (e.g., satellite in orbit), where the central terminal is configured to receive communications from remote terminals (e.g., lower orbit satellites, ground stations, moving ground platforms, aircraft, etc.), and to distribute the communications to other remote terminals. The high bandwidth opto-electronics may include, for example, optical transmitters and receivers. The opto-electronics, when installed at the central terminal in traditional embodiments, may increase a weight of the payload of the satellite, which contributes to increased launch costs. In particular, a demultiplexer may increase the weight of the payload of the satellite in traditional embodiments. Further, the opto-electronics may require periodic maintenance, and maintenance of the opto-electronics installed in the central terminal may be costly and time consuming, due at least to accessibility issues. Further still, outages may contribute to reduced network reliability and communication interruptions of the traditional satellite relay communication system. Radiation can alter the performance of opto-electronics. In a system with high speed opto-electronics, the high speed circuitry may be susceptible to radiation damage. In a system with wavelength filters and demultiplexers, the wavelength performance can shift due to radiation damage. By eliminating high speed opto-electronics and wavelength sensitive components from the central terminal, a cost-effective satellite payload can be deployed that is robust to radiation damage.

In accordance with the present disclosure, a satellite relay communication system may include a passive optical network in which high bandwidth or other opto-electronics are installed in remote terminals, and where the central terminal includes a passive optical router for communications received by any one of the remote terminals. For example, the remote terminals may include wavelength-division and/or time-division demultiplexing optical transceivers configured to process data signals sent and received by the remote terminals. The data signals may be in the form of digital bit streams or analog waveforms such as antenna signals. The central terminal may not include any wavelength-division and/or time-division demultiplexing transceivers. Instead, the central terminal may be equipped with free space optical (FSO) ports corresponding to each of the remote terminals, optical amplifiers, a passive optical network router, and/or other components that work in conjunction to receive optical signals from the remote terminals and relay the optical signals (or communication data contained therein) to the other of the remote terminals without demultiplexing signals at the central terminal. In some embodiments, the central terminal may include a multiplexer but not a demultiplexer. Further, the free optical ports may employ pointing, acquisition, and tracking (PAT) features to maintain alignment between terminals. In some embodiments, the passive optical network router may include a photonic integrated circuit (PIC), two or more signal splitters (e.g., 3 dB splitters), couplers (e.g., Y-couplers), and/or other components. Further, three-port circulators may be included at the central terminal or at each of the remoter terminals, depending on the embodiment.

By including the optical transceivers (e.g., including wavelength-division multiplexers and/or time-division demultiplexers) at the remote terminals and the passive optical router features at the central terminal, as described above, a cost for launching and maintaining the satellite relay communication system may be improved, and network reliability of the satellite relay communication system may be improved. These and other features will be described in detail below, with reference to the drawings.

FIG. 1 is a schematic view of an embodiment of a satellite relay communication system 20 having a passive optical network. In the illustrated embodiment, a central terminal 10 is configured to receive optical signals (e.g., data communications) from several remote terminals 12, 14, 16, 18, and to relay the optical signals (e.g., data communications) to the several remote terminals 12, 14, 16, 18 (e.g., via router 11 of the central terminal 10, where the router 11 may include a multiplexer 9). The satellite relay communication system 20 in the illustrated embodiment includes the four remote terminals 12, 14, 16, 18, although systems in accordance with the present disclosure may include two or more remote terminals. The remote terminals 12, 14, 16, 18 may be included at any combination of lower orbit satellites, ground stations, moving ground platforms (e.g., vehicles), or aircraft. The central terminal 10 may be included at a satellite in geostationary orbit, in higher orbit relative to lower orbits of any of the remote terminals 12, 14, 16, 18, or in any other orbit about Earth.

In general, the central terminal 10 may include only the optical equipment needed to relay data communications (e.g., optical signals) between the remote terminals 12, 14, 16, 18. That is, the remote terminals 12, 14, 16, 18 may include high bandwidth opto-electronics installed therein, such as optical transceivers having wavelength-division demultiplexers and/or time-divisional demultiplexers, while the central terminal 10 may include, for example, free space optical (FSO) ports configured to receive free space optical signals from the remote terminals 12, 14, 16, 18 (and send free space optical signals to the remote terminals 12, 14, 16, 18), a passive optical router 11 having optical ports directly or indirectly connected to the FSO ports via fiber connections, a photonic integrated circuit (PIC), two or more signal splitters (e.g., 3 dB splitters), couplers (e.g., Y-couplers), and/or other components. The router 11 or another component of the central terminal 10 may include a multiplexer 9 configured to, for example, receive a number of input signals from any combination of the remoter terminals 12, 14, 16, 18 and generate a composite signal having the number of input signals combined therein. Circulators may also be disposed at either the central terminal 10 or each of the remote terminals 12, 14, 16, 18, depending on the embodiment. Pointing, acquisition, and tracking (PAT) features may be utilized to maintain optical alignment between various terminals.

Figure 2:
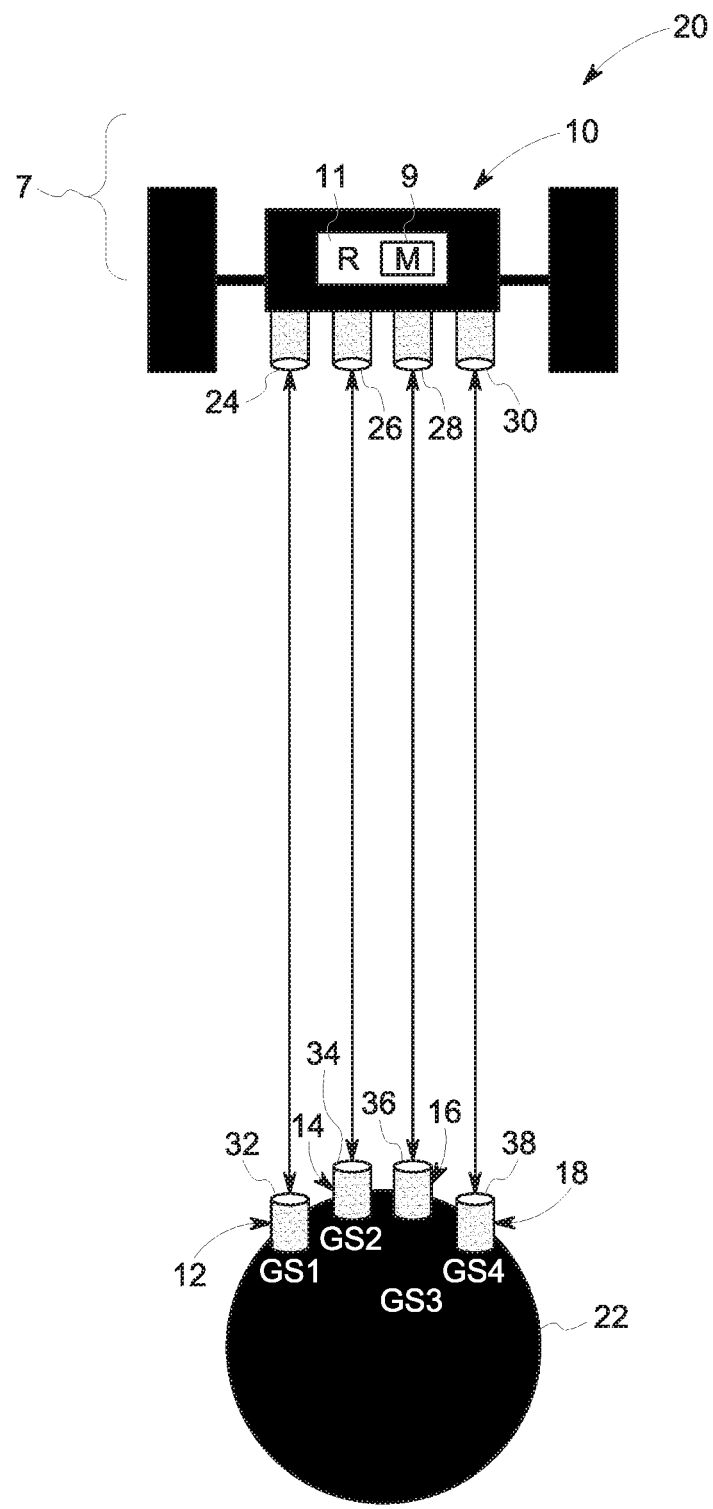
FIG. 2 is a schematic view of an embodiment of the satellite relay communication system of FIG. 1, having a satellite in geostationary orbit and including the central terminal with the passive optical router therein, and having multiple remote terminals including ground stations.
Figure 3:
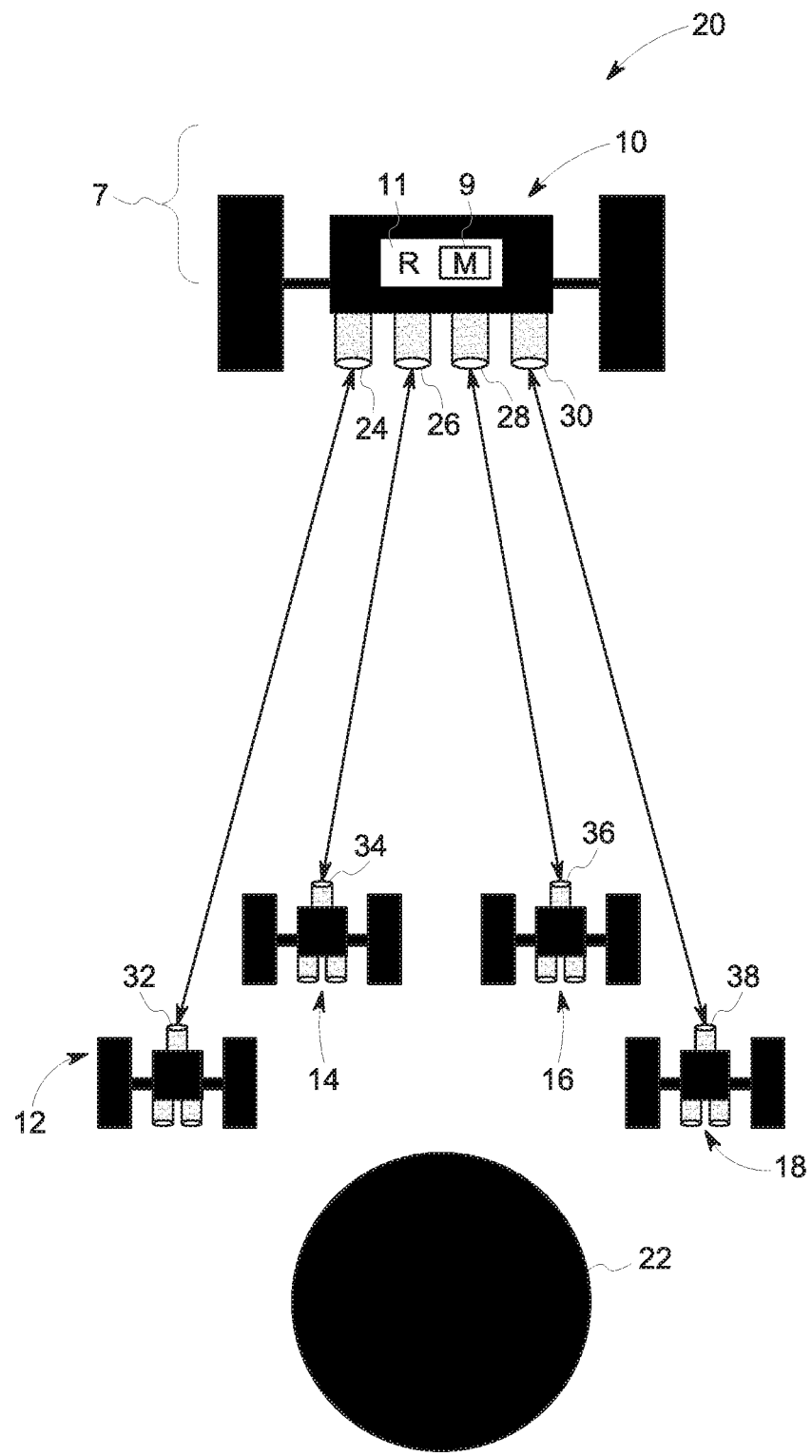
FIG. 3 is a schematic view of an embodiment of the satellite relay communication system of FIG. 1, having a satellite in a relative high orbit and including the central terminal with the passive optical router therein, and having multiple remote terminals including satellites in relatively low orbits.
Figure 4:
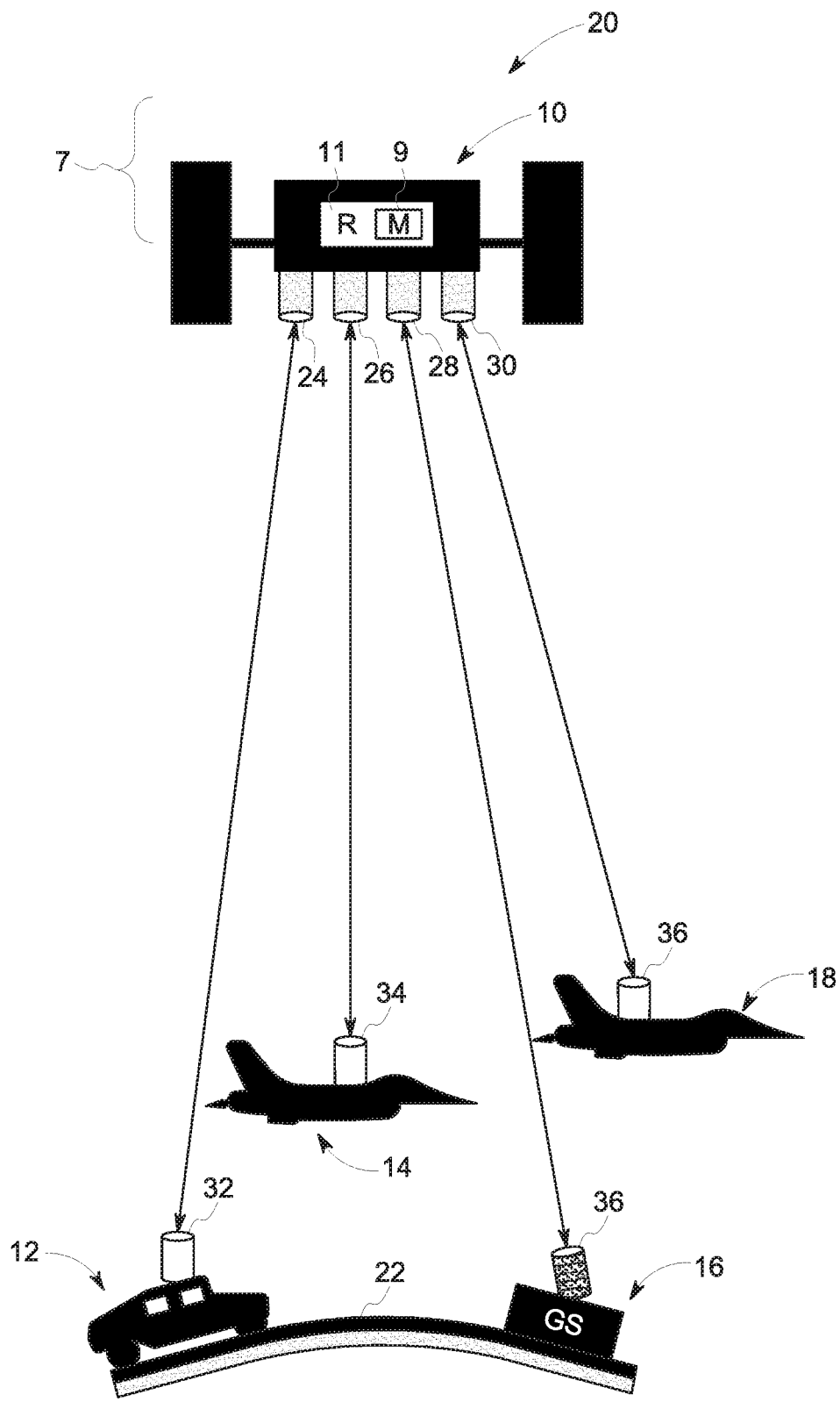
FIG. 4 is a schematic view of an embodiment of the satellite relay communication system of FIG. 1, having a satellite in orbit and including the central terminal with the passive optical router therein, and having multiple remote terminals including a ground station, a moving ground vehicle, and aircraft.

FIGS. 2-4 illustrate various embodiments of the satellite relay communication system 20. For example, FIG. 2 is a schematic view of an embodiment of the satellite relay communication system 20, where the central terminal 10 is included in a satellite 7 in geostationary orbit, and the remote terminals 12, 14, 16, 18 are all ground stations positioned on Earth 22. By including the central terminal 10 in the satellite 7 in geostationary orbit, the central terminal 10 remains in a fixed position relative to the fixed positions of the remote terminals 12, 14, 16, 18, or ground stations. Thus, the remote terminals 12, 14, 16, 18 and the central terminal 10 may always include relative positions that enable around-the-clock optical communication.

As shown, the central terminal 10 includes free space optical (FSO) ports 24, 26, 28, 30, and each remote terminal 12, 14, 16, 18 includes a corresponding FSO port 32, 34, 36, 38. As previously described, the FSO ports 24, 26, 28, 30, 32, 34, 36, 38 are configured to send and receive free space optical signals. The FSO ports 24, 26, 28, 30 of the central terminal 10 and the FSO ports 32, 34, 36, 38 of the corresponding remote terminals 12, 14, 16, 18, in addition to other componentry of the satellite relay communication system 20 (e.g., the passive optical router of the central terminal 10 and the wavelength-division or time-division demultiplexing transceivers of the remote terminals 12, 14, 16, 18), are configured to support bidirectional free space optical communication between each of the remote terminals 12, 14, 16, 18 and the central terminal 10. As previously described, the remote terminals 12, 14, 16, 18 include demultiplexers and the central terminal 10 may include the multiplexer 9 (e.g., included in the passive optical router 11).

FIG. 3 is a schematic view of another embodiment of the satellite relay communication system 20 of FIG. 1, where the central terminal 10 is included in a satellite 7 in relatively higher orbit about the Earth 22, and the remote terminals 12, 14, 16, 18 are included in satellites in relatively lower orbit about the Earth 22. Depending on the type of orbit employed, the central terminal 10 and the remote terminals 12, 14, 16, 18 may include relative positions that enable around-the-clock optical communication. Remote terminals may enter and exit the optical network as the satellites orbit the earth.

As in FIG. 2, the central terminal 10 in FIG. 3 includes the four FSO ports 24, 26, 28, 30 configured to receive and transmit optical signals from and to the remote terminals 12, 14, 16, 18. Likewise, each of the remote terminals 12, 14, 16, 18 includes the corresponding FSO ports 32, 34, 36, 38 configured to receive and transmit optical signals from and to the central terminal 10. The FSO ports 24, 26, 28, 30, 32, 34, 36, 38 and other componentry described with respect to later drawings enable bidirectional communication between the remote terminals 12, 14, 16, 18 and the central terminal 10. Further, as previously described, the router 9 (or other component of the central terminal 10) may include the multiplexer 9, while the remote terminals 12, 14, 16, 18 may include demultiplexers.

FIG. 4 is a schematic view of another embodiment of the satellite relay communication system 20 of FIG. 1, where the central terminal 10 is included in a satellite 7 in any orbit, and the remote terminals 12, 14, 16, 18 include various structures configured to receive and transmit optical signals. For example, the remote terminal 12 is included in a moving vehicle (referred to in some embodiments as a moving ground platform) positioned on the Earth 22, the remote terminal 14 is included in an aircraft traveling about the Earth 22, the remote terminal 16 is included in a fixed ground station positioned on the Earth 22, and the remote terminal 18 is included in an aircraft traveling about the Earth 22 (e.g., in a different position than the aircraft of the remote terminal 14). In FIG. 4, bidirectional optical communication between the central terminal 10 and the remote terminals 12, 14, 16, 18 is provided. Further, as previously described, the router 9 (or other component of the central terminal 10) may include the multiplexer 9, while the remote terminals 12, 14, 16, 18 may include demultiplexers.

Figure 5:
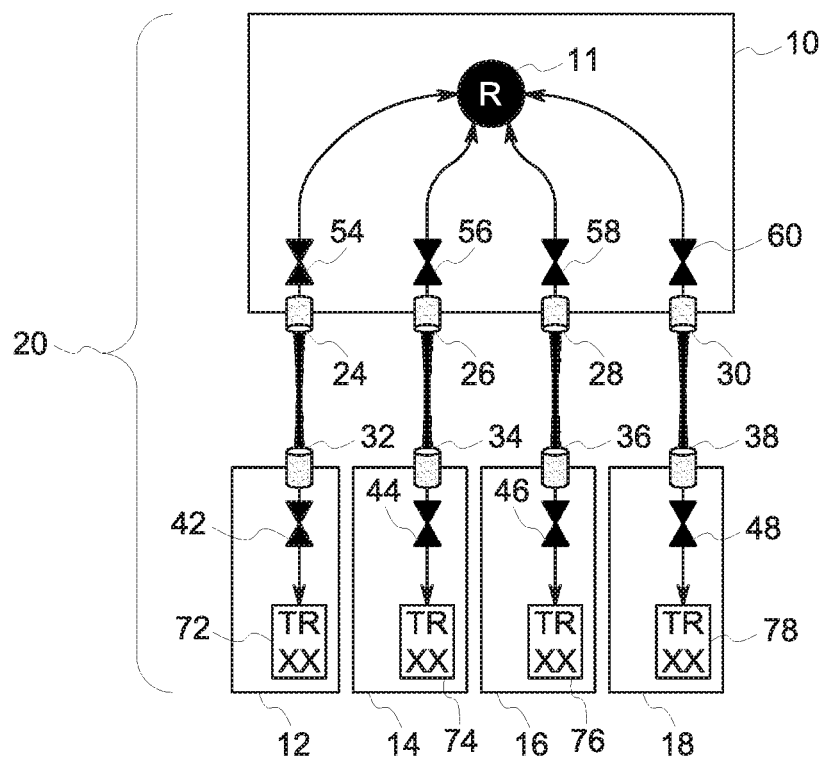
FIG. 5 is a schematic view of an embodiment of the satellite relay communication system of FIG. 1, having the central terminal with the passive optical router, and having multiple remote terminals.
Figure 6:
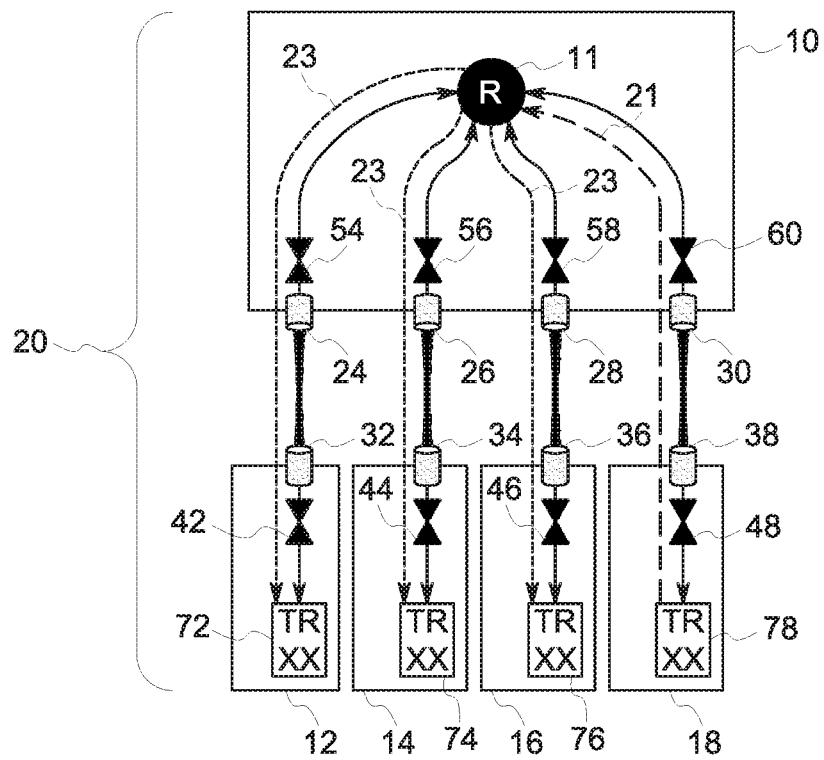
FIG. 6 is a schematic view of an embodiment of the satellite relay communication system of FIG. 5, having the central terminal with the passive optical router, having the multiple remote terminals, and including a communication relayed from one remote terminal to the other remote terminals via the passive optical router of the central terminal.

FIGS. 5 and 6 are schematic views of an embodiment of the satellite relay communication system 20 of FIG. 1, having the central terminal 10 and the remote terminals 12, 14, 16, 18. FIG. 5 illustrates the satellite relay communication system 20 generally, and FIG. 6 illustrates the satellite relay communication system 20 where the remote terminal 18 sends a data communication (long dashed line 21) via optical signal to the central terminal 10, the central terminal 10 receives the optical signal containing the data communication, and the central terminal 10 relays the data communication via other optical signals (three short dashed lines 23) to the remote terminals 12, 14, 16 (and, in some embodiments, back to the remote terminal 18 from which the central terminal 10 received the initial optical signal containing the data communication).

As shown in FIGS. 5 and 6, the satellite relay communication system 20 includes, at the central terminal 10, optical amplifiers 54, 56, 68, 60 corresponding to the FSO ports 24, 26, 28, 30. The satellite relay communication system 20 also includes, at the remote terminals 12, 14, 16, 18, optical amplifiers 42, 44, 46, 48 corresponding to the remote terminals 12, 14, 16, 18. The optical amplifiers 42, 44, 46, 48, 54, 56, 58, 60 may be configured to amplify, boost, attenuate, or otherwise modify optical signals passing therethrough. For example, the optical amplifiers 42, 44, 46, 48, 54, 56, 58, 60 are configured to amplify the optical signal(s) without first converting the optical signal(s) to electrical signal(s). It should be noted that separate ports may also be present (e.g., at the passive optical router 11 and/or at components of the remote terminals 12, 14, 16, 18). The separate ports of the passive optical router 11, described in more detail below, may be connected to the FSO ports 24, 26, 28, 30 via, for example, fiber cable connections. In certain embodiments, fiber cable connections may extend between the FSO ports 24, 26, 28, 30 and the optical amplifiers 54, 56, 58, 60, and between the optical amplifiers 54, 56, 58, 60 and the input ports of the passive optical router 11. Indeed, all or some of the connections internal to the central terminal 10 and internal to each of the remote terminals 12, 14, 16, 18 may include fiber cable connections. These and other features are described in detail below.

In accordance with the present disclosure, the satellite relay communication system 20 illustrated in FIGS. 5 and 6 may include optical transceivers 72, 74, 76, 78 positioned at, and corresponding to, the remote terminals 12, 14, 16, 18. The optical transceivers 72, 74, 76, 78 may be configured to process optical signals sent to the central terminal 10 and/or received from the central terminal 10. In particular, the optical transceivers 72, 74, 76, 78 may be configured to demultiplex various signals received therein, namely, by receiving a composite signal and dividing the composite signal into multiple individual demultiplexed signals that are routed to the appropriate receivers. Depending on the embodiment, wavelength-division or time-division demultiplexing may be used. By including the optical transceivers 72, 74, 76, 78 (which include wavelength-division or time-division multiplexers and demultiplexers), referred to in some embodiments as high-bandwidth opto-electronics, at the remote terminals 12, 14, 16, 18 instead of the central terminal 10, an overall cost for producing, launching, and maintaining the satellite relay communication system 20 may be reduced, at least because a payload of the central terminal is reduced and accessibility of the optical transceivers 72, 74, 76, 78 is improved over traditional embodiments. As previously described, the router 11 or other feature of the central terminal 10 may include a multiplexer configured to receive a number of input signals and to form the above-described composite signal having the number of input signals combined therein. The router 11 and the optical transceivers 72, 74, 76, 78 will be described in detail with reference to other drawings below.

Figure 7:
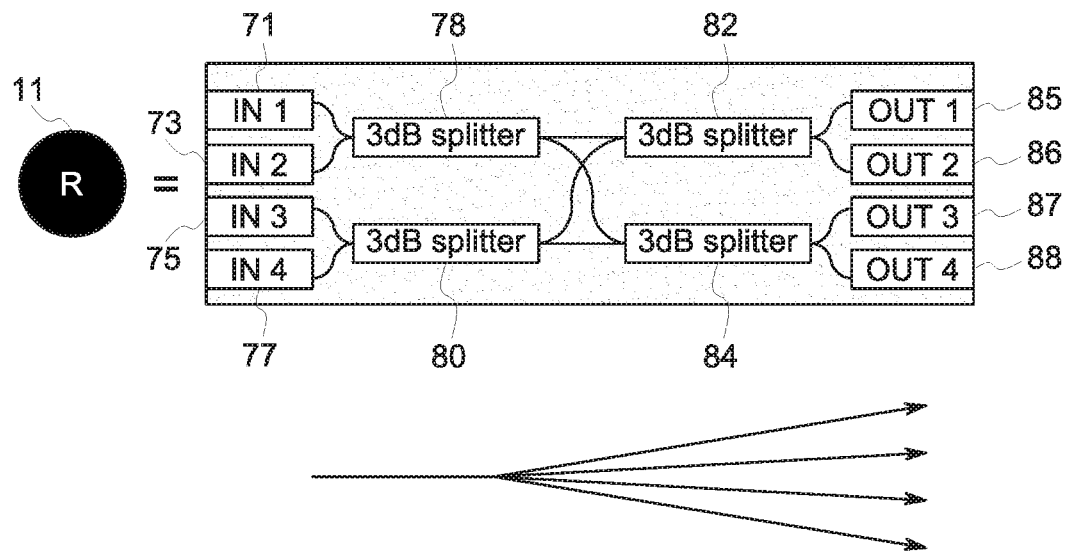
FIG. 7 is a schematic view of an embodiment of the passive optical router of the central terminal of the satellite relay communication system of FIG. 1, employing a four port star implementation.
Figure 8:
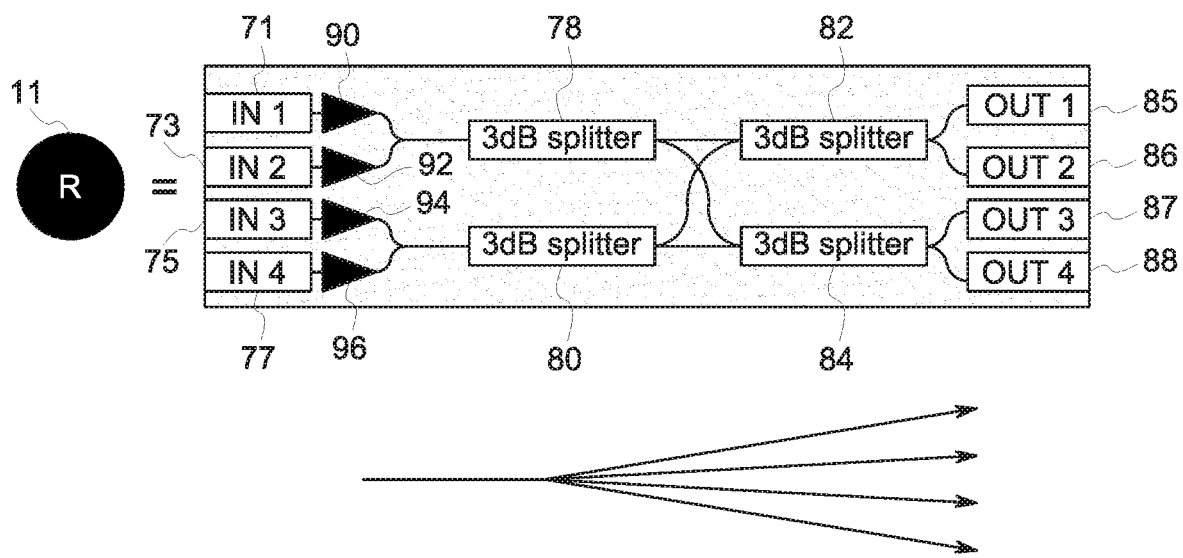
FIG. 8 is a schematic view of another embodiment of the passive optical router of the central terminal of the satellite relay communication system of FIG. 1, employing a four port star implementation with optical amplifiers.

FIG. 7 is a schematic view of an embodiment of the passive optical router 11 of the central terminal 10 of the satellite relay communication system 20 of FIG. 1. In the illustrated embodiment, the passive optical router 11 is configured in a four port star arrangement. The passive optical router 11 includes four input ports 71, 73, 75, 77. The four input ports 71, 73, 75, 77 of the passive optical router 11 may be connected to upstream componentry (e.g., amplifiers and/or FSO port of the central satellite) via fiber connections. As shown, four 3 dB splitters 78, 80, 82, 84 (or other signal splitters) are arranged to replicate, duplicate, and/or otherwise modify received optical signals from the input ports 71, 73, 75, 77. For example, the connections between the input ports 71, 73, 75, 77 and 3 dB splitters 78, 80, 82, 84 may be linked via fiber connections. The 3 dB splitter 78 may receive, for example, an optical signal from the first input port 71, and duplicate the optical signal and transmit the duplications to the downstream 3 dB splitters 82, 84. The downstream 3 dB splitters 82, 84 may receive the duplicated optical signal from the 3 dB splitters 78, and again replicate the duplicated optical signals and transmit the replicated optical signals to output ports 85, 86, 87, 88 of the passive optical router 11. That is, each initial optical signal from one of the ports 71, 73, 75, 77 may be duplicated by two of the 3 dB splitters 78, 80, 82, 84 (e.g., one upstream and one downstream splitter), resulting in four versions of the initial optical signal output through each of the output ports 85, 86, 87, 88. The output ports 85, 86, 87, 88 may be connected, directly or via intervening componentry, to the previously described FSO ports of the central terminal. FIG. 8 is a schematic view of an embodiment of the passive optical router 11 of the central terminal 10 of the satellite relay communication system 20 of FIG. 1, similar to FIG. 7, but including optical amplifiers 90, 92, 94, 96 between the input ports 71, 73, 75, 77 and the first two 3 dB splitters 78, 80. The optical amplifiers 90, 92, 94, 96 may boost the optical signals without having to first convert the optical signals to electrical signals.

Figure 9:
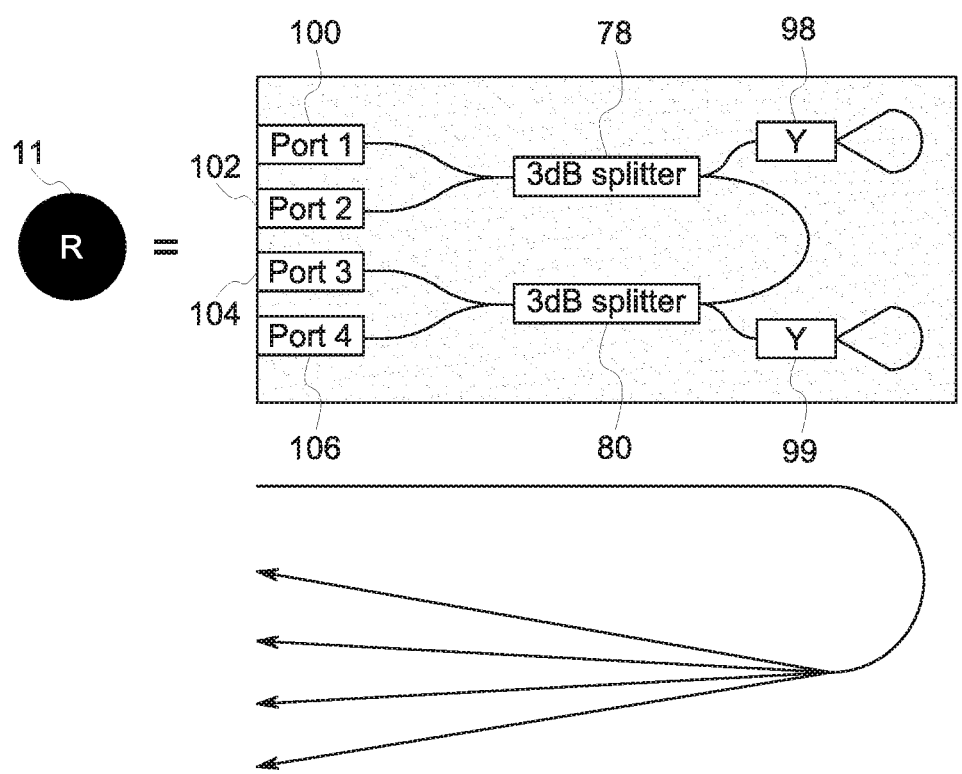
FIG. 9 is a schematic view of another embodiment of the passive optical router of the central terminal of the satellite relay communication system of FIG. 1, employing a four port reflective star implementation.

FIG. 9 is a schematic view of another embodiment of the passive optical router 11 of the central terminal 10 of the satellite relay communication system 20 of FIG. 1. In FIG. 9, only two 3 dB splitters 78, 80 (or other signal splitters) are used. Instead of the third and fourth downstream 3 dB splitters 82, 84 illustrated in FIGS. 7 and 8, the passive optical router 11 in FIG. 9 includes Y-couplers 98, 99 (or other couplers) that loop back to the 3 dB splitters 78, 80, where the 3 dB splitters 78, 80 duplicate the signals received from the Y-couplers 98, 99 (or other couplers) for output through bi-directional input/output ports 100, 102, 104, 106. That is, the 3 dB splitters 78, 80 act as both the upstream and downstream splitters in FIG. 9, where the Y-couplers 98, 99 (or other couplers) loop the optical signals from and to the 3 dB splitters 78, 80. Thus, the bi-directional input/output ports 100, 102, 104, 106 illustrated in FIG. 9 may operate as both input and output ports. Further, the bi-directional input/output ports 100, 102, 104, 106 may be connected to the FSO ports of the central terminal via fiber connections and/or other intervening componentry, such as amplifiers. The arrangement of the passive optical router 11 in FIG. 9 may be referred to as a four port reflective star, whereas the arrangements in FIGS. 7 and 8 may be referred to as a four port star. It should be noted that, in any of FIGS. 7-9, the illustrated components and/or similar components may be integrated via a photonic integrated circuit (PIC), which may reduce a size, weight, and complexity of the passive optical router 11.

In FIGS. 7-9, a multiplexer (e.g., the multiplexer 9 in FIGS. 1-4) may be disposed upstream or downstream of the various 3 dB splitters 78, 80, 82, 84 and/or Y-couplers 98, 99. The multiplexer is generally configured to receive a number of input signals (e.g., from various remote terminals) and form a composite signal having the number of input signals included therein. The router 11 may then transmit the composite signal to each of the remote terminals, which deconstruct the composite signal via a demultiplexers. These and other features will be described in detail below.

Figure 10:
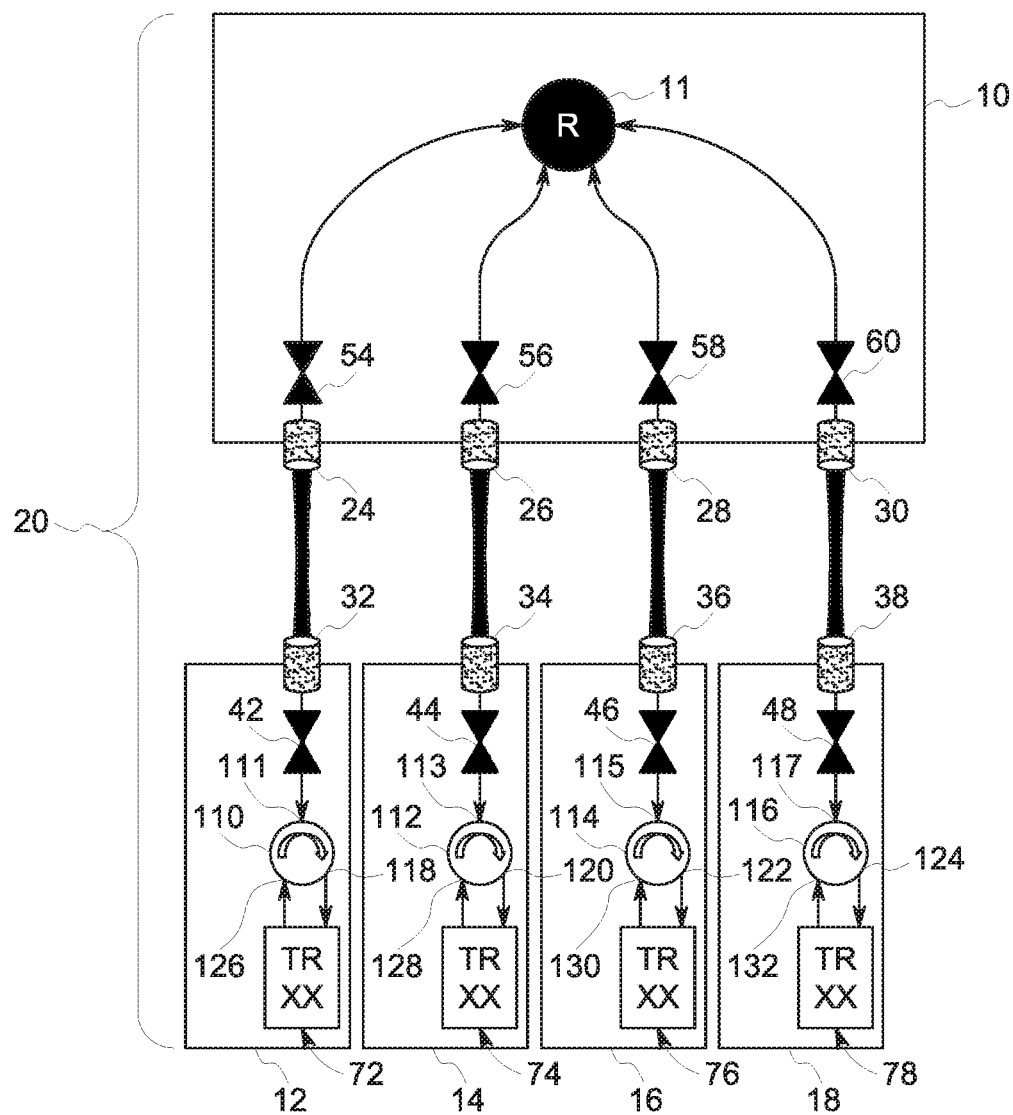
FIG. 10 is a schematic view of an embodiment of the satellite relay communication system of FIG. 1, having the central terminal and multiple remote terminals, and employing a four port reflective star implementation in which circulators are disposed in the multiple remote terminals.
Figure 11:
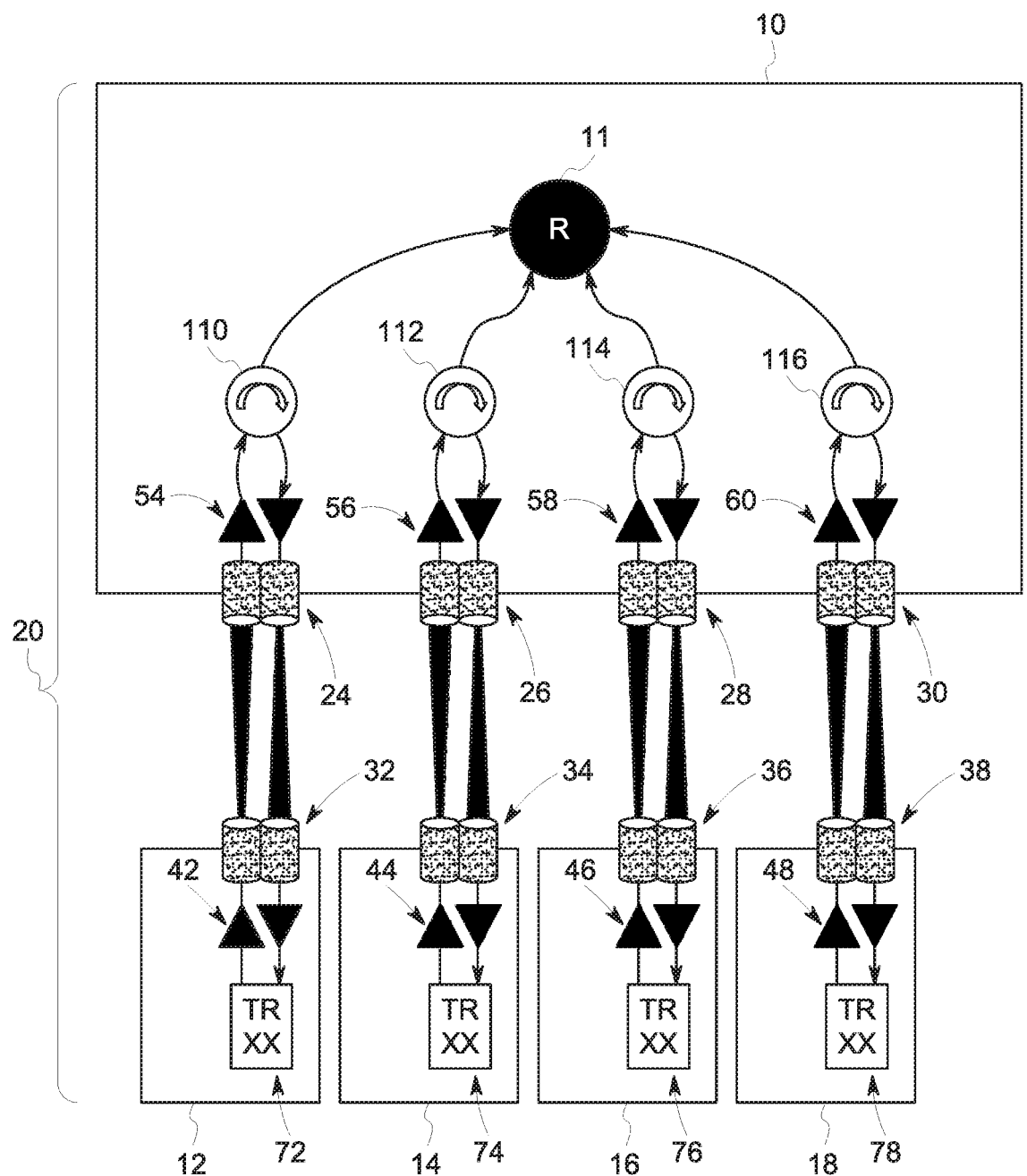
FIG. 11 is a schematic view of an embodiment of the satellite relay communication system of FIG. 1, having the central terminal and multiple remote terminals, and employing a four port reflective star implementation in which circulators are disposed in the central terminal.

FIGS. 10 and 11 are schematic views of embodiments of the satellite relay communication system 20 of FIG. 1, arranged in a four port reflective star configuration, in which three port circulators 110, 112, 114, 116 are utilized for data relay. In FIG. 10, the three port circulators 110, 112, 114, 116 are included at the remote terminals 12, 14, 16, 18. Each of the three port circulators 110, 112, 114, 116 at the corresponding remote terminals 12, 14, 16, 18 may include a corresponding first port 11, 113, 115, 117 configured to receive optical signals from the optical amplifiers 42, 44, 46, 48, a corresponding second port 118, 120, 122, 124 configured to output optical signals to a receiving portion of the optical transceiver 72, 74, 76, 78, and a corresponding third port 126, 128, 130, 132 configured to receive optical signals from a transmitting portion of the optical transceiver 72, 74, 76, 78. The optical transceivers 72, 74, 76, 78 are generally configured to demultiplex signals, as will be later described with reference to FIGS. 13-16. That is, the optical transceivers 72, 74, 76, 78 may receive a composite optical signal, divide the composite optical signal into multiple individual demultiplexed optical signals, and ultimately convert the appropriate demultiplexed optical signal to an electrical signal, as will be described in detail with reference to later drawings.

Figure 12:
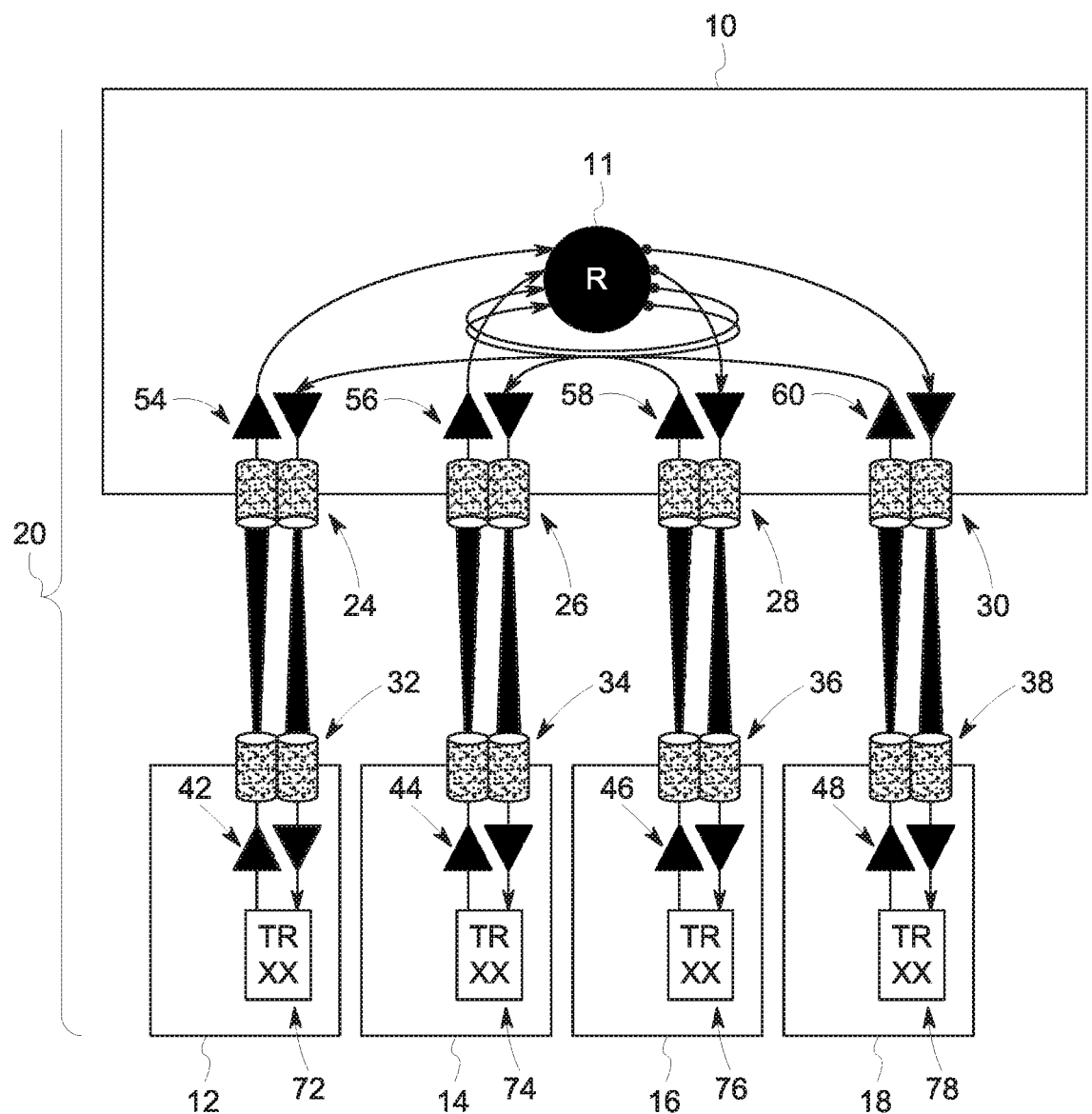
FIG. 12 is a schematic view of an embodiment of the satellite relay communication system of FIG. 1, having the central terminal and multiple remote terminals, and employing a four port star implementation.

In FIG. 11, the transmitted and received signals are combined in the central terminal 10 utilizing the three port circulators 110, 112, 113, 116 installed at the central terminal 10. For example, in FIG. 11, the three port circulators 110, 112, 113, 116 include the first ports 111, 113, 115, 117, the second ports 118, 120, 122, 124, and the third ports 126, 128, 130, 132, but the first ports 111, 113, 115, 117 are configured to receive signals from the passive optical router 11, as opposed to receiving signals from the optical amplifiers 42, 44, 46, 48 as illustrated in FIG. 10. Further, in FIG. 11, the optical amplifiers 42, 44, 46, 48 at the remote terminals 12, 14, 16, 18 may be split into receiving and transmitting segments, and the optical amplifiers 54, 56, 58, 60 of the central terminal 10 may be split into receiving and transmitting segments or portions. Likewise, the ports 24, 26, 28, 30, 32, 34, 36, 38 may be split into receiving and transmitting segments or portions. FIG. 12 is a schematic view of an embodiment of the satellite relay communication system 20 of FIG. 1, arranged in a four port star configuration, in which the circulators 110, 112, 114, 116 are not utilized. In FIG. 12, like in FIG. 11, the ports 24, 26, 28, 30, 32, 34, 36, 38 are split into transmitting and receiving segments, and the optical amplifiers 42, 44, 46, 48, 54, 56, 58, 60 are split into transmitting and receiving segments. It should be noted that in each of FIGS. 7-12, a two port or eight port star or reflective star arrangement may also be utilized.

FIGS. 13-16 are schematic views of embodiment of optical transceivers 200 for use at the remote terminals 12, 14, 16, 18 of the satellite relay communication system 20, and configured to demultiplex received signals to select one or more signals from an array of received signals. It should be noted that reference numeral 200 is utilized to generically refer to the optical transceivers in FIGS. 13-16, and may be incorporated as any of the transceivers 72, 74, 76, 78 corresponding to the remote terminals 12, 14, 16, 18 illustrated in the preceding drawings and described above.

Figure 13:
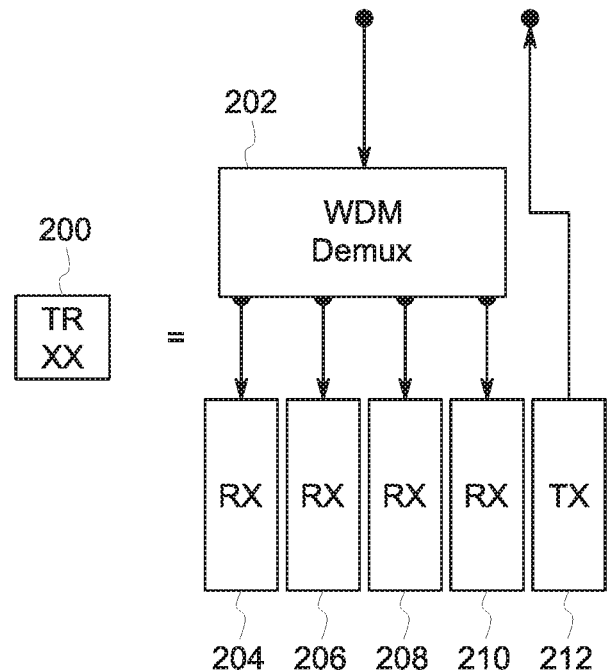
FIG. 13 is a schematic view of an embodiment of wavelength-division demultiplexing implementable in an optical transceiver of a remote terminal of the satellite relay communication system of FIG. 1.

In FIG. 13, the optical transceiver 200 is configured for wavelength-division demultiplexing. For example, the transceiver 200 includes a wave-division demultiplexer 202 (e.g., "WDM demux") which receives a composite input signal composed of signals from multiple remote terminals, divides it into individual signals, and routes each demultiplexed signal to one of the receivers 204, 206, 208, 210. For example, the receivers 204, 206, 208, 210 may correspond to the several remote terminals described in previous drawings, and each of the several remote terminals may include a particular wavelength assigned thereto. The demultiplexer 202 may receive an optical signal and determine, based on the wavelength of the received optical signal, to which of the several remote terminals the optical signal belongs. Receivers (labeled "RX") 204, 206, 208, 210 may then convert the signal to an electrical signal. Of course the received optical signal would have already been routed through the central terminal as described with respect to previous drawings. The illustrated transceiver 200 also includes a transmitter (labeled "TX") 212 configured to convert an electrical signal to an optical signal with a particular wavelength assigned to the transceiver 200, as suggested above.

Figure 14:
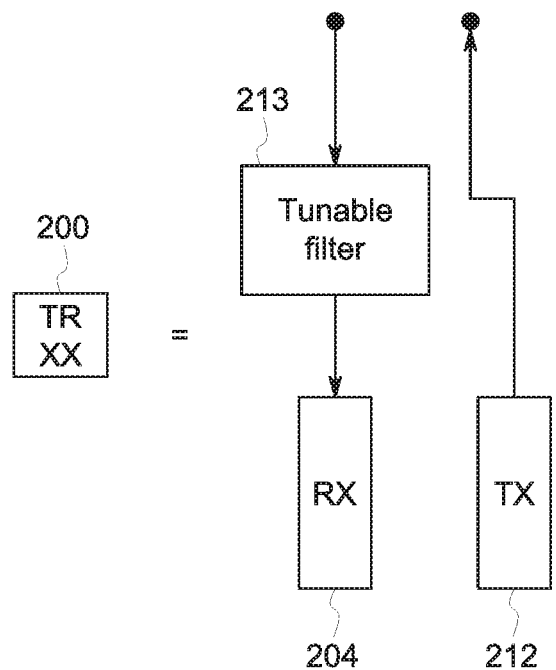
FIG. 14 is a schematic view of another embodiment of wavelength-division demultiplexing implementable in an optical transceiver of a remote terminal of the satellite relay communication system of FIG. 1.

In FIG. 14, another embodiment of wavelength-division demultiplexing is illustrated. In FIG. 14, the transceiver 200 includes only one receiver 204, the transmitter 212, and a tunable filter 213. In the illustrated embodiment, the transmitter 212 includes a particular wavelength assigned thereto. Thus, the transmitting output line of another transceiver of another remote terminal will send, via the router in the central terminal, to the illustrated transceiver 200 an optical signal of a particular wavelength assigned to the other remote terminal/transceiver. The illustrated transceiver 200, when attempting to receive optical signals from the other remote terminal/transceiver (e.g., by way of the passive optical router of the central terminal), tunes the tunable filter 213 to the corresponding wavelength, enabling the receiver 204 to receive the desired signal, and to convert the received signal to an electrical signal.

Figure 15:
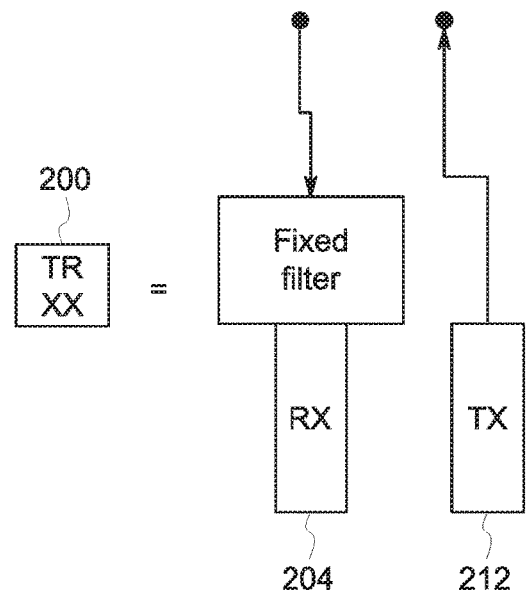
FIG. 15 is a schematic view of another embodiment of wavelength-division demultiplexing implementable in an optical transceiver of a remote terminal of the satellite relay communication system of FIG. 1.

In FIG. 15, another embodiment of wavelength-division demultiplexing is illustrated. In FIG. 15, the receiver 204 of the transceiver 200 is assigned a particular wavelength for receiving optical signals. The other transceivers of the other remote terminals, when transmitting a signal to the illustrated transceiver 200, then tune transmitted optical signals to correspond to the assigned wavelength of the transceiver 200. That is, in the illustrated embodiment, the transmitter 212 would be tuned to send an optical signal having a particular wavelength assigned to one of the other remote terminals, in order to send the optical signal to said other remote terminal (e.g., by way of the passive optical router of the central terminal). As shown, a fixed filter may be a part of the receiver 204, or may be separate from the receiver 204, and may enable a fixed wavelength for the receiver 204 to receive optical signals.

Figure 16:
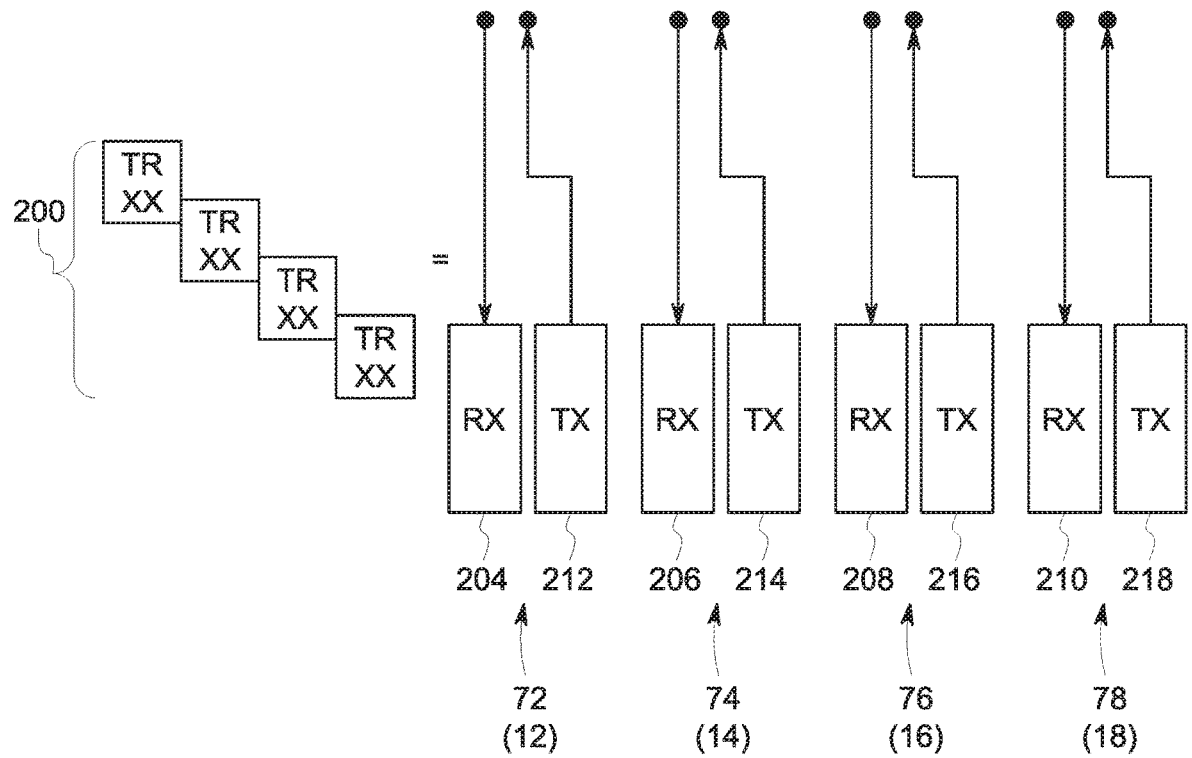
FIG. 16 is a schematic view of an embodiment of time-division demultiplexing implementable in an optical transceiver of a remote terminal of the satellite relay communication system of FIG. 1.

In FIG. 16, the transceivers are configured for time-division multiplexing. In FIG. 16, unlike in FIGS. 13-15, all transceivers (e.g., transceivers 72, 74, 76, 78) from all the remote terminals (e.g., remote terminals 12, 14, 16, 18) are depicted. In this embodiment, all transmitters/receivers of the various transceivers 200 utilize the same wavelength band. However, the remote terminals coordinate sharing the passive optical router of the central terminal by using separate time slots. That is, in the illustrated embodiment, the transmitters 212, 214, 216, 218 are configured to transmit different time slots. The receivers 204, 206, 208, 210 can then choose which transmitter and corresponding remote terminal to receive from by only turning on during the desired remote terminal's time slot. In this way, optical signals of the same or similar wavelength can be transmitted and received by each of the remote terminals through the central terminal while maintaining integrity of the information contained therein (including from where the optical signal was originally transmitted). In addition to the described embodiments, an optical multiplexer may also be included in one or more of the transceivers 200 to combine multiple signals on multiple wavelengths before insertion into the relay system from one of the remote terminals.

Technical effects of the invention include, compared to traditional embodiments, reduced launch time and costs of satellite relay communication systems, reduced maintenance time and costs of satellite relay communication systems, and improved network reliability of satellite relay communication systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A satellite relay communication system, the comprising:

a central terminal having a passive optical router and a multiplexer, wherein the central terminal is configured to:
   receive optical signals from a first remote terminal and a second remote terminal of the satellite relay communication system;
   duplicate and multiplex the optical signals to form a plurality of duplicate composite optical signals; and
   send the plurality of duplicate composite optical signals toward a plurality of remote terminals of the satellite relay communication system; and
the plurality of remote terminals having a corresponding plurality of demultiplexers configured to demultiplex the plurality of duplicate composite optical signals received from the central terminal at the plurality of remote terminals.

2. The satellite relay communication system of claim 1, wherein the central terminal does not include an optical transceiver configured to demultiplex optical signals.

3. The satellite relay communication system of claim 1, comprising a plurality of optical amplifiers and a corresponding plurality of optical communication ports.

4. The satellite relay communication system of claim 1, wherein the corresponding plurality of optical communication ports include a plurality of free space optical (FSO) ports.

5. The satellite relay communication system of claim 1, wherein the passive optical router includes at least one 3 dB splitter, at least one Y-coupler, or a combination thereof.

6. The satellite relay communication system of claim 1, wherein the passive optical router includes at least two 3 dB splitters, at least two Y-couplers, and a plurality of bi-directional input/output ports.

7. The satellite relay communication system of claim 1, wherein the passive optical router includes a photonic integrated circuit (PIC).

8. The satellite relay communication system of claim 1, wherein the plurality of demultiplexers is configured to wavelength-division demultiplex optical signals or time-division demultiplex optical signals.

9. A method of communicating with a satellite relay communication system, comprising:
   transmitting a first optical signal from a first remote terminal of the satellite relay communication system to a central terminal of the satellite relay communication system;
   transmitting a second optical signal from a second remote terminal of the satellite relay communication system to the central terminal of the satellite relay communication system;
   receiving the first optical signal and the second optical signal at the central terminal;
   multiplexing and duplicating the first optical signal and the second optical signal, via a passive optical router and/or multiplexer of the central terminal, into a plurality of duplicate composite optical signals;
   transmitting the plurality of duplicate composite optical signals toward a corresponding plurality of remote terminals; and
   demultiplexing the plurality of duplicate composite optical signals via optical transceivers of the corresponding plurality of remote terminals.

10. The method of claim 9, wherein demultiplexing the plurality of duplicate optical signals via the optical transceivers of the corresponding plurality of remote terminals includes wavelength-division demultiplexing or time-division demultiplexing.

* * * * *